Figure 1:
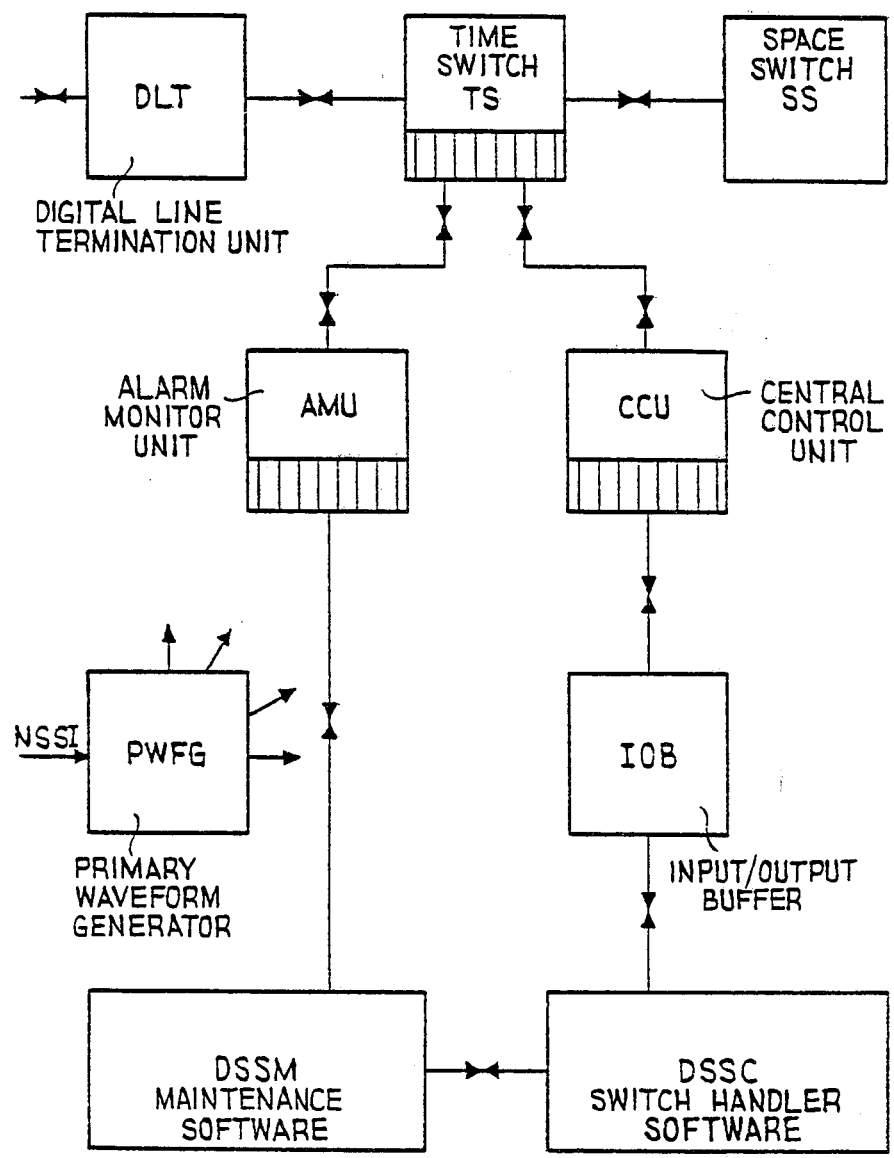

United States Patent [19]

Creteau

[11] 4,387,456
[45] Jun. 7, 1983

[54] ALARM MONITORING ARRANGEMENTS FOR DIGITAL TELECOMMUNICATIONS SWITCHING NETWORKS

[75] Inventor: Peter V. Creteau, Wimborne, England

[73] Assignee: The Plessey Company plc, Illford, England

[21] Appl. No.: 176,135

[22] Filed: Aug. 7, 1980

[30] Foreign Application Priority Data

Aug. 10, 1979 [GB] United Kingdom ............. 7927858

[51] Int. Cl.$^3$ .............................................. H04J 3/14
[52] U.S. Cl. ........................................ 370/13; 370/59
[58] Field of Search ..................... 370/13, 58, 59, 14

[56] References Cited

U.S. PATENT DOCUMENTS 4,138,599  2/1979  Munter ............................. 370/13

FOREIGN PATENT DOCUMENTS 2819646  11/1979  Fed. Rep. of Germany ........ 370/13
2001228  1/1979  United Kingdom .
1544389  4/1979  United Kingdom ......... 179/175.2 R
1544390  4/1979  United Kingdom ......... 179/175.2 R

OTHER PUBLICATIONS

"GTE's Remote Maintenance Monitor and Control System" (RMCS) Proceedings of the National Electronics Conference, vol. 32, Oct. 16-18, 1978, by Klimowski.

Primary Examiner—Douglas W. Olms
Attorney, Agent, or Firm—Fleit, Jacobson & Cohn

[57] ABSTRACT

In digital telecommunication switching systems the switch block includes an alarm monitor unit (AMU) which is used for initiating maintenance related commands in addition to monitoring, persistance checking and filtering alarm outputs. It is particularly useful in relieving the main processing system of routine alarm processing. The AMU collects line and switch block fault indicators from the digital line termination units DLT, applies persistance checks to determine if the alarm is transient or significant and depending on the outcome it identifies the precise location of the alarm and formats an error report to the processor. Each DLT communicates to and from an AMU by way of an alarm interface unit in the time switch serving the DLT using status and command highways respectively over 2048 kb/s balanced lines. The DLT uses 32 time slots to code-up status information in a time related manner (i.e. bit n of 256 has a defined significance such as speech parity error plane 1, channel m). The particular inventive concept is embodied in the arrangement where bit 6 of all channels is a "flag" per DLT, indicating that the DLT has some error, alarm or other information, to convey to the AMU. The AMU can select status information from 1 of 32 DLTs but in parallel with the reception of such data the AMU continues to receive the bit 6 flag of all 32 DLTs, one DLT flag per channel period. Persistance logic in the AMU on the bit 6 flag is used as an interrupt pointer for the AMU selection of a total status stream from one particular DLT.

3 Claims, 4 Drawing Figures

ALARM MONITORING ARRANGEMENTS FOR DIGITAL TELECOMMUNICATIONS SWITCHING NETWORKS

The present invention relates to telecommunications switching systems handling digital information and is more particularly concerned with arrangements for monitoring alarm conditions in such systems.

According to the invention there is provided a digital telecommunications exchange including (i) a plurality of digital line termination units each unit terminating a single bidirectional time division multiplex digital exchange line, (ii) a time-space switching network and (iii) an alarm monitor unit and each digital line termination unit communicates with an alarm monitor unit by way of an alarm interface unit using status and command time division multiplex highways and one bit of each channel extending from an alarm interface unit to the alarm monitor unit is used as an alarm flag allocated to a discrete digital line termination unit.

The alarm monitor unit (AMU) is used for initiating maintenance related commands in addition to monitoring, persistence checking and filtering alarm outputs. It is particularly useful in relieving the main processing system of routine alarm processing. The AMU collects line and switch block fault indicators from the DLT, applies persistence checks (using leaky bucket techniques) to determine if the alarm is transient or significant and depending on the outcome it identifies the precise location of the alarm and formats an error report to the processor. Each DLT communicates to and from an AMU by way of an alarm interface unit in the time switch serving the DLT using status and command highways respectively over 2048 kb/s balanced lines. The DLT uses 32 time slots to code-up status information in a time related manner (i.e. bit n of 256 has a defined significance such as speech parity error plane 1, channel m). The particular inventive concept is embodied in the arrangement where bit 6 of all channels is a "flag" per DLT, indicating that the DLT has some error, alarm or other information, to convey to the AMU. The AMU can select status information from 1 to 32 DLTs but in parallel with the reception of such data the AMU continues to receive the bit 6 flag of all 32 DLTs, one DLT flag per channel period. Persistence logic in the AMU on the bit 6 flag is used as an interrupt pointer for the AMU selection of a total status stream from one particular DLT.

Figure 2:
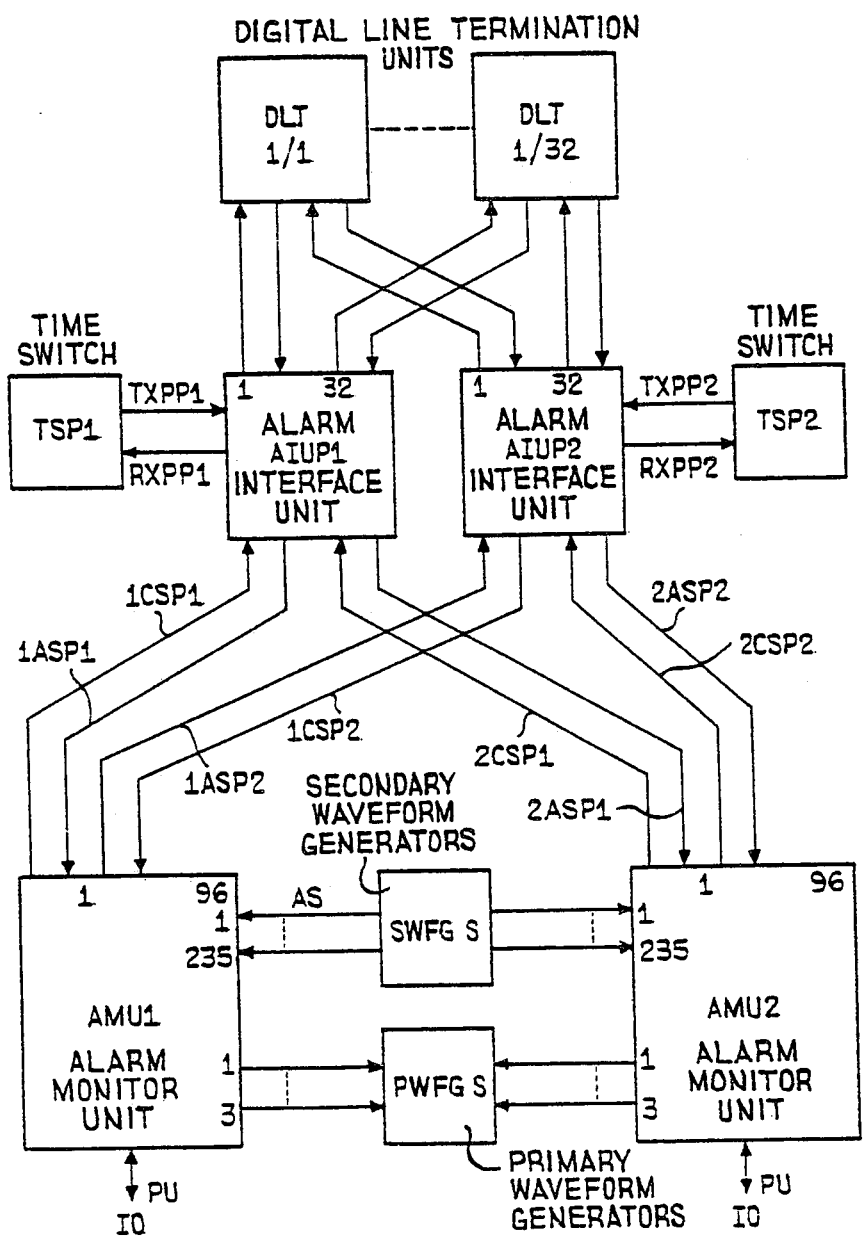
Figure 3:
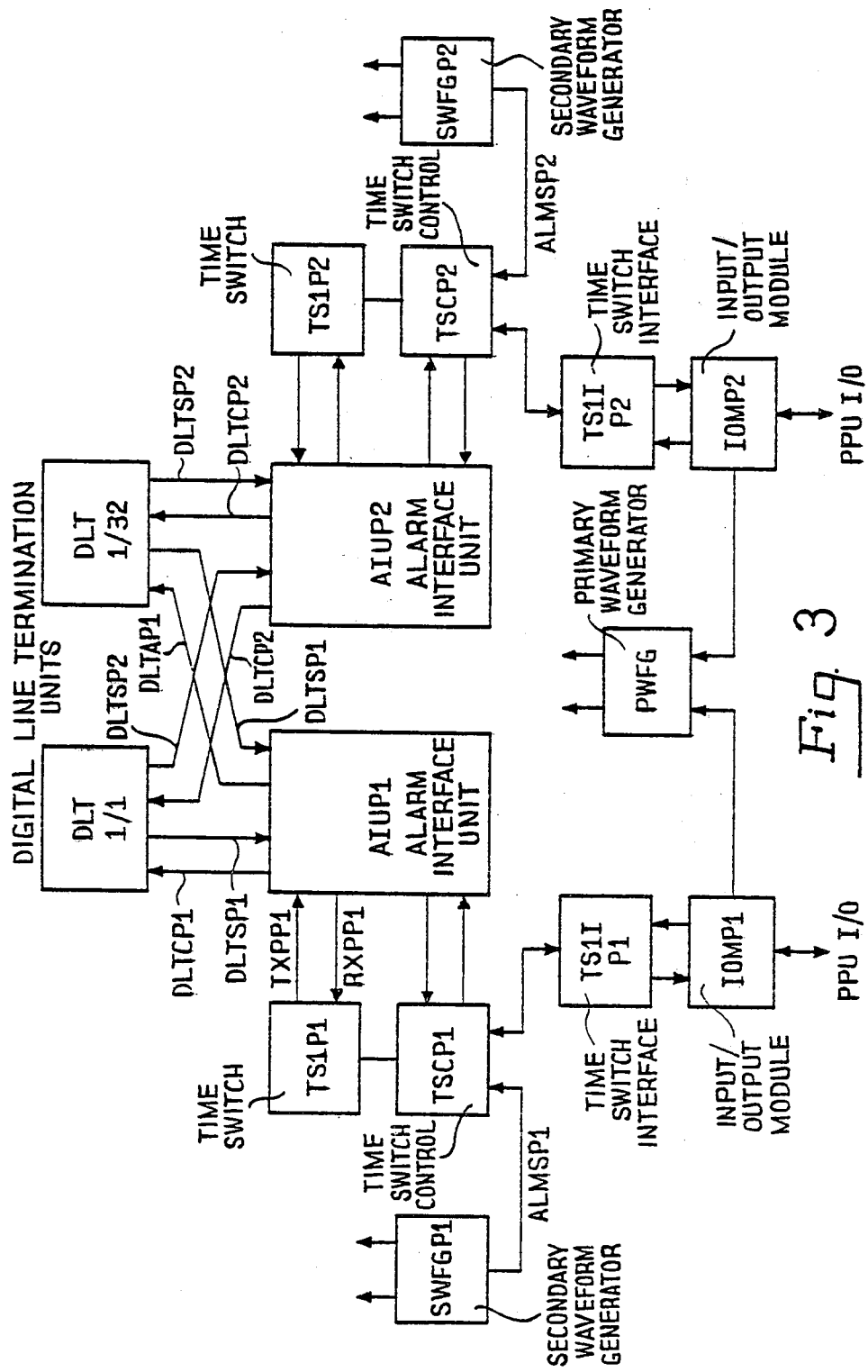
Figure 4:
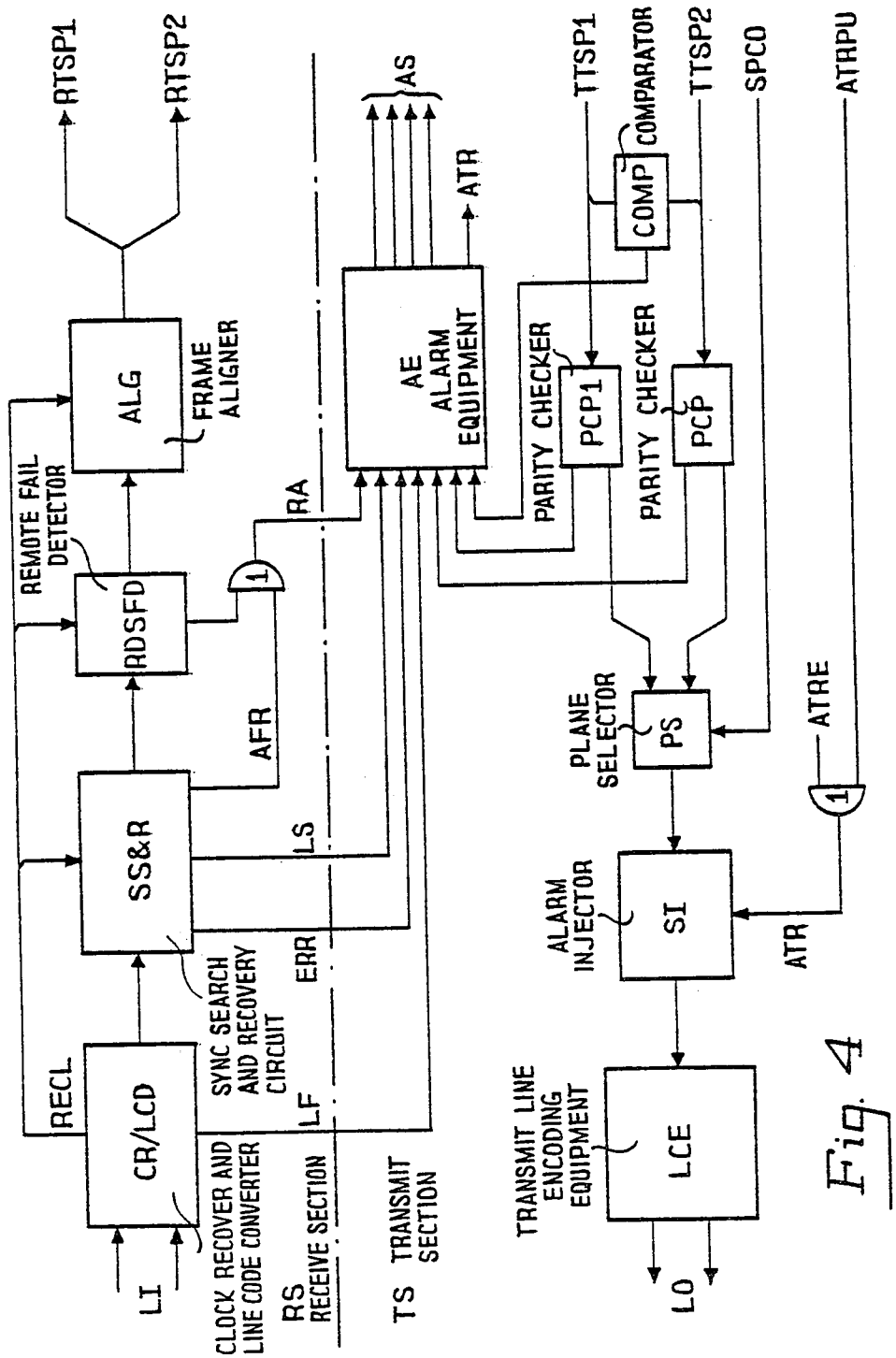

The following description of one embodiment of the invention will be used to describe the invention together with its various features which should be read in conjunction with the accompanying drawings. Of the drawings:

FIG. 1 shows a block diagram of a modular telecommunications exchange suitable for use in one embodiment of the invention, FIG. 2 shows the equipment required for one embodiment of the invention, FIG. 3 shows the equipment required for a second embodiment of the invention while FIG. 4 shows the equipment required in a digital line termination unit for use with both embodiments of the invention.

In modern telecommunication switching exchanges it is customary to provide a number of sub-systems which are integrated together using stored program control to provide the overall exchange system. The particular sub-system to which the invention relates is a so-called "Digital Switching Sub-system" (DSS). One example of a suitable exchange system is the British Post Office System X and this is described in an article entitled System X by J. Martin in Vol. 71 Part 4 (January 1979) of the Post Office Electrical Engineers Journal on pages 221 to 224. The following description related to FIG. 1 will be sectionalised in accordance with the sections or modules shown in FIG. 1.

The range of functional entities from which DSS is constructed are listed below with a simplified description of each.

The Digital Line Termination Unit (DLT) provides the interface between the four-wire, 32 time slot, 2048 kb/s multiplexes and the switchblock. As described later it plays a wide range of roles, some associated with the line systems, some with the security, fault finding and diagnosis of the trunking.

The Time Switch (TS) contains the speech stores, control memories and associated hardware and firmware logic enabling the contents of one of its input time slots to be transferred to any output time slot.

The Space Switch (SS) is the array of selector devices enabling spatial connection of two different links or highways within the trunking. Acting in time-division mode the crosspoint configuration can change at the rate of appearance of the time slots.

The Central Control Unit (CCU) is a combination of hardware and firmware, interacting with the trunking to perform such functions as interrogation for free paths and establishment of such paths once they are found. It relieves the main processing system of load, especially important in large exchanges where high demands are made on that main processing system by the many sub-systems which it serves.

The Alarm Monitor Unit (AMU) in a similar manner to the CCU, is a combination of hardware and firmware included to relieve main processing of load,—in this instance by preprocessing alarm data. It is a more active device than its name implies, initiating maintenance related commands in addition to monitoring, persistence checking and "filtering" alarm outputs. It is an important part of the maintenance pathway from switch to main processor, independent of the CCU route, which in large exchanges can be fully occupied with control information.

The Primary Waveform Generator (PWFG) is the timebase or clock on which all the digital logic of the DSS is dependent. It supplies 8 KHz frame start signals and 2048 KHz, bit streams, the latter of which may be multiplied by phase locked loop and voltage control oscillators at appropriate points in the switch where higher frequencies are required for direct application to logic devices or for division back to 2048 KHz signals of high tolerance mark-space ratio. In main network switching centres the PWFG frequency is influenced by the Timing Unit of a National Synchronisation Utility.

The Local Synchronisation Utility (LSU) is the unit which acts on the PWFG of local exchanges, which do not justify direct frequency control by the National Synchronisation Utility. It uses two of the incoming PCM links from the higher order Main Network Switching System as sources of derived timing to maintain the frequency of its oscillators at the mean frequency of these links using phase locked loop techniques. Master standby operation is employed on the two LSU oscillators.

The Input Output Buffer (IOB) is the hardware control interface with the multiprocessor system. It provides storage for the queueing of messages from control software to CCU and vice versa.

The Input Output Module (IOM) is a simplified equivalent of the IOB, used mainly in dual processor controlled exchanges and communicating control and alarm information to and from the switchblock. It does not include queueing facilities.

The Switch Handler Software (DSS CONTS) is the DSS applications process which receives control tasks from DSS user-subsystems such as the Call Processing Subsystem. The handler validates commands, checking that the user subsystem has a right of access to the switch terminations it is addressing. It instructs the DSS hardware to perform such operations as connection set-up using Network Termination Identities supplied by the requesting subsystem and responds to that subsystem with a confirmation (or otherwise) of the successful execution of the operation. There is a degree of implementation dependence in DSS software functions related to the break point in exchange size, multiprocessor or dual processor control. There is also much commonality.

The Maintenance Software (DSS MS) is the DSS applications process(es) concerned with fault handling at various levels of detection, routining and diagnostics. It interacts with the handler software and with the Maintenance Control System.

The configuration of DSS functional entities in a large exchange role (e.g. Digital Main Switching Centre or International Switching Centre) is indicated in FIG. 1. The following more detailed description of the trunking and control areas will demonstrate the design commonality of this large exchange DSS with its small exchange variant used, for example, in local exchanges.

The Switchblock

Time Switch speech stores of 1024 words are convenient in terms of component availability and timing. In the TST trunking one receive time switch terminates the 1024 channels from thirty two multiplexes and one transmit time switch the 1024 channels to the same multiplexes. The maximum quantity of 3072 multiplexes require 96 receive and 96 transmit time switches interconnected by a 96×96 space switch. Thus the links from time switch to space switch must have the capability of carrying 1024 channels in each frame, (125 microseconds). By adopting parallel links on which each time slot carries a complete speech sample on 8 wires DSS requires 1024 time slots per frame. The link bit-rate is therefore 8192 kb/s. In practice this is achieved by space dividing each 8096 kb link into two 4096 kb/s components.

While the space switch could be operated at 8192 kb/s there is little advantage in terms of equipment quantity, the inclusion of 4096 kb/s cable remultiplexing logic offsetting the saving in "crosspoint" components. Additionally the continued separation of the 4096 kb/s sections of the trunking through the space switch reduces the effects of hardware failures.

There are three distinct phases in the passage of a speech sample through the trunking:
(a) time of reception
(b) time allocated by control for cross-office switching via the space switch
(c) time of transmission

The Time Switch

The principal function of the time switch is to provide the necessary buffering between the above time instants (a), (b) and (c). A secondary but important role concerns alarm interfacing between trunking and alarm monitor common equipment. The total time switch is a sohisticated arrangement of hardware and microprocessor firmware. For simplicity it can be described in terms of the following three areas:
The Speech Stores (plus DLT interfaces and store retiming registers)
The Control Stores (plus CCU interfaces)
The Alarm Interface Unit (plus DLT interfaces and AMU interfaces)

The Receive Speech and Control Stores

The receive speech store words are dedicated to the channel identities of the 32 receive multiplexes. The eight-bit samples (with accompanying parity bits) are "cyclically" written into their corresponding store locations; i.e. in an invariant cycle under counter control, channel O of multiplex O is written into store location O, and so on. The reading process is governed by the content of Receive Control Store which loaded by central control "circulates" at cross-office slot rate and causes the appropriate sample to appear on the parallel highway to the space switch at the timeslot chosen for that connection. This procedure of reading the speech stores according to addresses relating to the current connection configuration of the switchblock is referred to as "acyclic read". The control store is cross-office-slot ordered; at each "busy" cross-office slot it outputs a 12 bit address, 5 bits defining one of 32 multiplexes, 5 bits defining 1 of 32 channels, a busy bit indicating that the cross-office slot is in use, and a parity bit.

The Transmit Speech and Control Stores

The transmit speech store holds the speech sample from its time of reception from the space switch until its time of transmission to its outgoing multiplex. Here again writing is cyclic, reading acyclic. In the cyclic-write, speech store locations are dedicated to cross-office slots. The acyclic read is governed by a control store which circulates in relationship to the appearance of the channels on the outgoing multiplexes; for each such busy channel it outputs a 12 bit address, 10 bits defining 1 of 1024 speech store locations (each equivalent to a cross-office slot), a busy bit and a purity bit.

The Alarm Interface Unit (AIU)

The AIU is located in the time switch for convenience of interfacing to the alarm monitor unit AMU but in practice its main functions are concerned with the communication of information relating to the alarm, fault location and diagnostic logic of those DLTs associated with that time switch. For this purpose AIU has a command highway to each DLT and a status highway from each DLT. The full significance of these highways will become evident when the DLT is described later; from the time-switch viewpoint they play a role which relates to the passage of parity information through the trunking. Since the T-S-T area is operating in parallel switching mode but the DLT speech information is communicated to it in serial, 2048 kb/s form, it is necessary to provide separate parity paths between DLTs and TSs and to process the parity bits at the timeswitch to take account of the serial/parallel conversion, remultiplexing and other retiming undergone by the speech samples. It is the AIU which performs this manipulation of the parity bits and uses its command and status highways to its DLTs to transport the parity bits. Thus the parity bits from the DLT are presented in correct format to the receive time switch speech store and the parity bits from the transmit time switch are organised to appear at the correct DLT in phase with the Speech Samples to which they relate.

Alarm Structure

The general function of the Alarm Monitor Unit has already been outlined, and further detail will emerge when the DLT alarms, fault location, routining and diagnostic features are discussed. It is appropriate at this point, however, to show the location of the AMU in the "larger" switch structure particularly in terms of its interfaces, FIG. 2. Note that the AMU is concerned with functions peculiar to DSS-i.e. the polling, collection and persistence checking of its logic or line alarm and status information and with the issue of commands to the DSS fault location and diagnostic hardware,—AMU is not involved in the handling of power supply alarms; this is a general requirement of all hardware subsystems and is dealt with by direct connection of power supply alarms to a Maintenance Control Subsystem facility which also communicates at software level with DSS processes.

As shown in FIG. 2 the AMU interfaces to the PU directly and like the IOB it operates in main and standby mode. Through this medium the AMU communicates with DSS maintenance software supplying pre-processed alarm information and receiving fault location and diagnostics instructions (in addition to those which AMU initiates itself).

Via the AIU in the timeswitch the AMU collects line and switchblock fault indicators from DLT, applies persistence checks to determine if the alarm is significant or transient and depending on the outcome it identifies the precise location of the alarm and formats an error report to software.

Other sources of alarms to the AMU are the secondary waveform generators distributed throughout the subsystem. In addition to passive monitoring of these SWFG alarms, AMU co-operates with maintenance software in the routining of the waveform distribution system. The AMU has a command interface to each of the primary waveform generators. This provides a routining capability whereby AMU can disable selected groups of 2048 kb/s and frame-reset outputs for a preset time and check that fault reports are received from the majority decision logic of the corresponding SWFGs.

Control and Alarm Structure in Smaller Exchanges

We have already seen the way in which the large, DSS trunking can be efficiently sub-equipped for application in smaller exchanges such as Local Switching Centres. The DSS control and alarm structure is similarly simplified for such applications. This reduction in DSS common equipment is in line with the scaling-down in the exchange control system from the multi-processing PU to the dual processor PPU (so-called because of its historical role as a pre-processor utility).

With smaller trunking size and relatively low control throughout it becomes practical to employ software techniques more extensively in DSS control:—It becomes attractive to "map" the current busy/free states of the time switches in PPU memory, perform the free-path interrogation process in handler software and communicate directly with the time switch control stores (via time switch firmware) to update the control stores and perform the other trunking-related procedures previously described under the heading of CCU functions. The CCU is, therefore, redundant to the smaller exchange applications of DSS and is not provided. Further the full facilities of the IOB are no longer required, it being unnecessary for example to maintain input-output queues of control messages; the IOB is replaced by a simpler input-output module IOM. The interface between IOM is of a 2048 kb/s bidirectional type, identical to that between CCU and TS and it carries timeswitch data in the same 40 bit message formats.

The alarm structure of smaller DSS installations is also simplified relative to that previously described under the AMU heading. FIG. 3 the microprocessor of the timeswitch has now the capacity to perform the AMU functions and the Timeswitch—IOM communication medium can accommodate both control and alarm data. Thus the AMU and its interfaces to AIU and software processes are handled within the microprocessor.

The Digital Line Termination Unit

The role of the DLT is two-fold:

Each DLT card terminates a bidirectional 2048 kb multiplex of G732 format, performing the line associated functions of alarm detection and insertion, error rate monitoring, alignment and conversion of bipolar line code to binary logic-compatible form. The HDB3 line code is fully described in an article entitled "30-Channel Pulse Code Modulation System" in the Post Office Electrical Engineers Journal in three parts. Part 1 appearing in Vol. 71 Part 1 (April 1978) at page 5, Part 2 appearing in Vol. 71 Part 2 (July 1978) at page 82 and Part 3 in Vol. 71 Part 4 (January 1979) at page 225. The DLT is not required to supply power feed to the transmission systems, this being one of the exchange line termination functions external to DSS.

The DLT plays an important range of switch-related operations. Some are connected with the security duplication of the trunking and the avoidance, detection and location of switch faults, others facilitate the switching of the "spare" bits of the synchronisation channel—i.e. those bits undefined for frame recognition purposes and available as data bearers for network administration or control purposes.

Interaction with AMU

In both the above roles the DLT interacts with the AMU function whether that function is contained in the specific AMU unit of the larger exchanges or incorporated in the timeswitch control microprocessor of smaller switching centres. For simplicity the term AMU is used to cover both implementations. The AMU in its turn is interactive with DSS and MCS software resident in PU or PPU.

DLT communication to and from AMU is via the AIU of the timeswitch using status and command highways respectively. Corresponding status and command logic blocks within DLT communicate with the AIU over 2048 kb/s balanced lines and a similar arrangement is employed between AIU ad AMU. The DLT uses 32 time slots to code-up status information to the AIU, in a time related manner, i.e. bit n of 256 has a defined significance—such as speech parity error, plane 1, channel m. Bit 6 of all channels is a "flag" per DLT, indicating that the DLT has some error, alarm or other information to convey to AMU.

The AMU can select status information from 1 of 32 DLTs but in parallel with the reception of such data AMU continues to receive the bit 6 flag of all 32 DLTs, one DLT flag per channel period. Persistence logic in the AMU on the bit 6 flag is a pointer for the AMU selection of a total status stream from one particular DLT. Additionally the AMU may be steered to a DLT by a maintenance software command.

The 2048 kb/s command highways from AMU to AIU and AIU to DLT do not have channel significance (apart from their role in conveying speech parity from Timeswitch to DLT as described earlier). AMU originated messages are label addressed to one or all 32 DLTs, the label being decoded at the AIU and the command content being passed to the DLT for execution—e.g. locking of DLT to one of its duplicated timeswitching (i.e. in Plane 1 or Plane 2). The label also contains a sub-field which simply instructs the AIU to present a total status stream from one DLT.

DLT Line-Related Functions

The DLT line-related functions are contained within three logic areas. These are the line processor, the error rate monitor and the aligner and are shown in FIG. 4. The line processor operations can be summarised under four headings:

Encoding/decoding of HDB3 signals and recovery of received clock CR/LCD

HDB3 encoding is described in Reference 1 but it is worth noting that the circuitry involved contains a transformer which provides isolation between line and DLT logic elements. The received clock is recovered by a ringing circuit whose output is used later in the DLT aligner in conjunction with a remote framing signal also provided by the line processor. The recovered clock is also made available to the local Synchronisation Utility of those switching centres which require such a network frequency reference.

Identification of remotely originated alarm information AE

This may take two forms. The Distant Alarm Bit (bit 3 in channel O of odd frames) provides an indication that the remote end of the line is suffering problems such as high error rate, HDB3 decoding failure or loss of synchronisation. The alarm encoder AE is required to detect a logic 1 state in the Distant Alarm Bit, and via AMU notify MCS which will initiate and co-ordinate a network fault location procedure; this may involve DSS maintenance software since the cause of the distant alarm may lie in the local DSS itself.

The other type of received alarm data is the Alarm Indication Signal (AIS), nominally continuous stream of logical ones throughout the frame. This indicates failure in transmission equipment at a higher order level than the 2048 kb/s system and the alarm may indicate failure of the supermultiplexer or demultiplexer equipment. DSS cannot be the cause of the failure but is required to stop its propagation and inform MCS of the alarm condition using the alarm encoder AE. Any persistent remote alarm implies of course that the system recognises the multiplex to be currently unusable and DSS software records are correspondingly updated.

Local detection of line failures and errors SS&R

Locally detected failures are indicated when the HDB3 input is lost (line fail) or when the synchronisation pattern is not identified in its expected location for three consecutive even frames (Synch. Loss). Line fail or synch. loss are notified to MCS and DSS sends a Distant Alarm Bit signal.

Errors take the form of incorrect synchronisation patterns, where the divergence of one or more synchronisation bits from the specified pattern is defined as an error, but the divergence is not sustained such as to constitute sync. loss. The "errors" indication is passed to the error-rate monitor for more detailed analysis. The errors are detected in the synchronisation search and recovery equipment SS&R.

Insertion of transmitted Channel O patterns SI

This circuitry uses the DSS clock framing signal and 2048 kb/s bit stream to insert a wired-in synchronisation pattern into transmit Channel O on even frames, and to introduce current alarm status information in Channel O of odd frames.

The Error Rate Monitor

The task of the error rate monitor is to analyse the "errors" signal from the line interface circuitry in order to specifically identify three error rates, 1 in $10^3$, 1 in $10^4$, and 1 in $10^5$. It is located in the alarm equipment AE and consists of sampling, counting and persistence-timing logic; this operates according to an algorithm which neglects "burst-error" conditions but ensures that consistent low quality transmission is recognised. Specifically if a 1 in $10^3$ error rate is identified the error rate monitor will disable the input to DSS. All three error rate occurrences are notified to MCS via the DLT status processor and AMU. The error rate monitor also multiplexes the other line alarms onto status lines and includes the 5-bit DLT address.

Switch-Related DLT Functions

The switch-related DLT functions fall into three categories.
  those directly associated with the duplicated trunking,
  those related to fault location generally,
  those concerned with the switching of channel O "spare-bits".

Security Plane Selection

Following frame alignment the DLT attaches parity to the received speech samples before they enter the duplicated TST trunking planes. The transmit side TS of the DLT refers to the parity states of the channels emerging from the two security planes to determine which should be connected to the transmit multiplex using the comparator COMP. The sample to be used is made by the sample selector PS.

This security plane selection is performed on a per-channel basis for each 32 channel multiplex. Where the choice to be made as a per-multiplex basis, the "broadcasting" of a fault from the receive side of the trunking could rapidly affect many or all of the transmit selectors, putting one complete security plane out of use. There would then be an excessive reliability onus on the remaining plane.

The parity-based plane-selector is backed-up by an inter-plane channel comparator and a historic bias memory. If the two emerging coincident samples are different but both carry good or bad parity, the comparator detects the difference and reference is made to the historic bias memory; its record of previous relative performance of the two planes is used to bias the direction of the channel selector.

Channel conscious parity selection of output channels provides protection against a high proportion of faults, i.e.:

those due to corruption of loss of a channel in its passage through a trunking plane.

those caused by a control hardware failure which, detected by the control logic itself, (e.g. by parity check on store or crosspoint addresses), forces "bad" parity onto the speech highways.

Until maintenance software, via the AMU function has detected a fault (e.g. by parity or discrepancy) and located the source (e.g. by path trace identifying converging switchpaths), the DLT hardware is solely responsible for correcting the errors. Once the fault has been located, the associated trunking is marked "out-of-service" by the insertion of idle code and "bad" parity in the appropriate location of the transmit timeswitch. The DLT recognises this out-of-service state as distinct from an error condition and the DLT error correction logic is released to deal with subsequent errors,—i.e. its historic bias and channel selector circuitry has more definite information which to continue operation.

What we claim is:

1. A telecommunications exchange handling time division multiplex digital information, comprising:

a plurality of digital line termination units, each terminating a single bidirectional time division multiplex digital exchange line;

a time space switching network; and at least one alarm monitor unit;

wherein each digital line termination unit is served by one of the alarm monitor units, and each digital line termination unit includes error detection means for detecting errors, and wherein each digital line termination unit includes, for alarm communication purposes, means for communicating with an alarm monitor unit using status and command time division multiplex highways, and each digital line termination unit is allocated an address indicative of a discrete channel in the status time division multiplex highways serving the digital line termination unit, and each channel includes an alarm bit controlled by the digital line termination unit having the corresponding address, and the alarm monitor unit includes means for monitoring the alarm bits.

2. A telecommunications exchange according to claim 1 wherein the command highway is used to communicate maintenance commands from the alarm monitor unit to the digital line termination units.

3. A telecommunications exchange according to claim 1 or claim 2 wherein the digital line termination units are divided into groups, and each group of digital line termination units is served by an alarm interface unit which includes means for selecting one of the digital line termination units, which it serves exclusively to transmit alarm information to the status highway in response to information communicated to the alarm interface unit from the alarm monitor unit over the command highway.

* * * * *